United States Patent [19]
Koga et al.

[11] Patent Number: 5,442,507
[45] Date of Patent: Aug. 15, 1995

[54] MAGNETORESISTIVE MAGNETIC HEAD

[75] Inventors: Naoki Koga, Tamana; Akira Gyotoku, Kumamoto, both of Japan

[73] Assignee: Matsushita Electric Industrial Co., Ltd., Osaka, Japan

[21] Appl. No.: 166,090

[22] Filed: Dec. 13, 1993

[30] Foreign Application Priority Data

Sep. 24, 1993 [JP] Japan .................. 5-237838
Sep. 27, 1993 [JP] Japan .................. 5-239685

[51] Int. Cl.$^6$ ............................................. G11B 5/39
[52] U.S. Cl. ................................................ 360/113
[58] Field of Search ..................................... 360/113

[56] References Cited
U.S. PATENT DOCUMENTS

| | | | |
|---|---|---|---|
| 4,713,708 | 12/1987 | Krounbi et al. | 360/113 |
| 4,754,354 | 6/1988 | Jeffers | 360/113 |
| 5,005,096 | 4/1991 | Krounbi et al. | 360/113 |
| 5,225,951 | 7/1993 | Kira et al. | 360/113 |

FOREIGN PATENT DOCUMENTS 60-59518  4/1985  Japan .
5-135332  6/1993  Japan .

Primary Examiner—John H. Wolff
Attorney, Agent, or Firm—Ratner & Prestia

[57] ABSTRACT

A magnetoresistive magnetic head comprising a magnetoresistive film, a pair of hard magnetic material films disposed on the magnetoresistive film, and a pair of leads disposed on the magnetoresistive film for feeding a sense current to the magnetoresistive film, wherein at least a part of each lead is formed between the pair of hard magnetic material films on the magnetoresistive film. According to this construction, generation of unstable magnetization at both ends of the track portion can be suppressed, so that a large reproduction output may be obtained.

14 Claims, 9 Drawing Sheets

SENSE CURRENT DIRECTION

MAGNETORESISTIVE MAGNETIC HEAD

BACKGROUND OF THE INVENTION

The present invention relates to a magnetoresistive magnetic head (MR magnetic head) used in magnetic recording apparatus such as magnetic disk apparatus.

FIG. 1 is a front view showing a conventional MR magnetic head. This MR magnetic head comprises a substrate 1, an insulating layer 2 disposed on the substrate 1, a lower shield layer 3 disposed on the insulating layer 2, an insulating layer 4 as a lower reproduction gap formed on the lower shield layer 3, a magnetoresistive film 7 (MR film), a soft magnetic material film 5 for applying a transverse bias magnetic field to the MR film 7, an intermediate layer 6 for magnetically decoupling the soft magnetic material film 5 and MR film 7, an undercoating film 8 composed of Cr and others, a hard magnetic material film 9 for controlling the magnetic domain of the MR film, a conductive lead layer 10, an insulating layer 11 as an upper reproduction gap, an upper shield layer 12, an insulating film 13 for separating the reproducing head and recording head, a lower core layer 14 of recording head, an insulating layer 15 as a recording gap, an upper core layer 16 of recording head, and an insulating layer 17 as a protective layer.

In the case of this head, since the width of the recording track and the width of the reproducing track can be set individually, it is possible to record widely and reproduce narrowly. Besides, as the transverse bias system for keeping the linearity of the output, a method called Soft-Adjacent-Layer (SAL) bias. system is employed. In this SAL bias system, the soft magnetic material film 5 is magnetized by the magnetic field generated by a sense current flowing in the MR film 7, and a bias magnetic field is applied to the MR film 7 by the magnetic field generated from the magnetization of the soft magnetic material film 5. The hard magnetic material film 9 is to control the magnetic domain of the MR film 7 to form into a single magnetic domain in order to suppress the Barkhausen noise peculiar to the MR reproducing head.

In the MR film 7, by the magnetic flux getting from a magnetic recording medium into the MR film 7, especially by the magnetic flux getting vertically into the confronting surface of the magnetic recording medium, the direction of its internal magnetization is changed, and the electric resistance varies with the change of the direction of magnetization. Therefore, it is the MR reproducing head that picks up the change of this electric resistance as a signal and reproduces the data. In other words, when the direction of magnetization undergoes a large change as the magnetic flux enters, the reproduction output increases, so that the data can be reproduced more effectively.

By disposing the hard magnetic material film 9 magnetized in one direction, as shown in FIG. 2, the part of the MR film 7 facing the hard magnetic material film 9, that is, both end parts of the MR film 7 are magnetized opposite to the direction of magnetization of the hard magnetic material film 9. Besides, the middle part of the MR film 7, that is, the track portion T contributing most to the reproduction characteristic is magnetized in the same direction as the direction of magnetization of the hard magnetic material film 9. At this time, by being formed so that the direction of magnetization of the hard magnetic material film 9 may be parallel to the confronting surface of the magnetic recording medium, the magnetization of the track portion T may also be parallel to the confronting surface of the magnetic recording medium. Therefore, when a vertical magnetic flux enters the MR film 7, the direction of magnetization of the track portion T undergoes a large change, so that a large reproduction output is obtained.

In such an MR reproducing head, however, when the width TW of the track portion T is narrowed for downsizing the apparatus, a problem occurs because the reproduction output is decreased.

In the small-sized magnetic disk apparatus, since the individual servo head was not available, it was necessary to control the servo by using the MR reproducing head itself. However, since both ends of the track portion T are very unstable under magnetization, if the magnetic recording medium is out of the recording track, the linearity of the reproduction output is poor, and the servo performance is impaired. In particular, when the track width is narrow, the effect of the track end portions increases relatively, and hence the track density cannot be enhanced.

SUMMARY OF THE INVENTION

It is hence an object of the invention to provide an MR magnetic head with a large reproduction output.

In carrying out our invention in one preferred mode, we utilize a magnetoresistive magnetic head comprising a magnetoresistive film, a pair of hard magnetic material films disposed on the magnetoresistive film, and a pair of leads disposed on the magnetoresistive film for feeding a sense current to the magnetoresistive film, wherein at least a part of each lead is formed between the pair of hard magnetic material films on the magnetoresistive film. In this construction, generation of unstable magnetization at both ends of the track portion is suppressed, so that a large reproduction output may be obtained.

DESCRIPTION OF THE PREFERRED EMBODIMENTS

Embodiment 1

Figure 1:
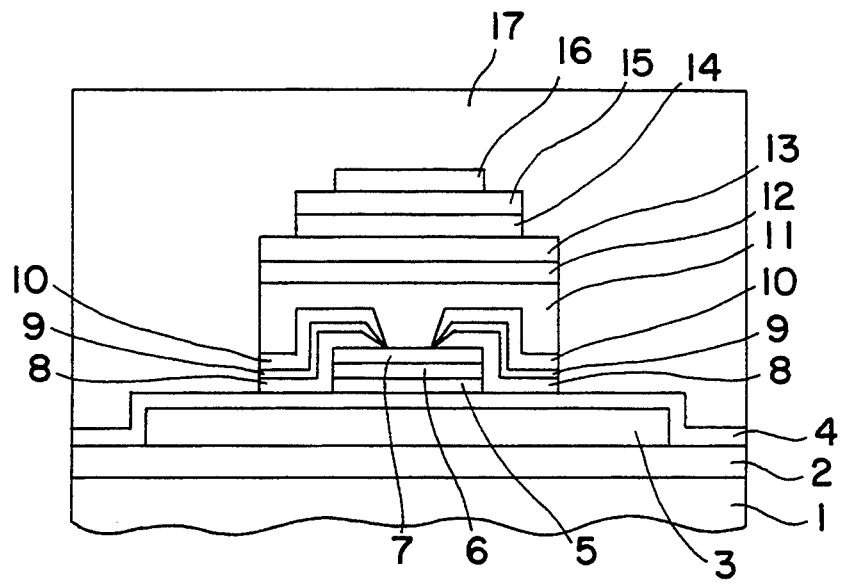
FIG. 1 is a front view of a conventional magnetoresistive magnetic head as seen from the side confronting (facing) a magnetic recording medium.

In FIGS. 3, 4, 5, 6, a substrate 100 is composed of a ceramic material, such as $Al_2O_3TiC$ and Mn—Zn ferrite. When the surface of the substrate 100 is coarse, it is finished to a mirror-smooth surface so that the coarseness may be less than several nanometers.

An insulating film 101 disposed on the surface of the substrate 100 is composed of insulating material such as $SiO_2$ and alumina, and is formed by sputtering or other conventional methods. When the surface of the insulating film 101 is coarse, the surface is finished to a mirror smoothness until the thickness of the insulating film 101 may be about several micrometers.

A shield film 102 formed on the mirror-smooth finished surface of the insulating film 101 is composed of a magnetic material such as sendust and permalloy, and its film thickness is about 1 to 5 microns. The shield film 102 is formed by a sputtering method in the case of sendust, or by plating in the case of permalloy.

An insulating film 103 formed on the shield film 102 is made of insulating material such as $SiO_2$ and alumina, and is formed by a sputtering method. Its film thickness is about 100 to 300 nm.

A bias film 104 of about 20 to 50 nm in film thickness formed on the insulating film 103 is formed by soft magnetic material such as a CoZrMo amorphous alloy.

A spacer 105 of 10 to 30 nm in film thickness formed on the bias film 104 is formed of $SiO_2$, Ti, Ta or the like.

An MR film 106 of 20 to 50 nm in film thickness formed on the spacer 105 is made of a material having magnetoresistive properties, such as Ni—Fe.

A reproduction element 107 is composed of the bias film 104, spacer 105, and MR film 106.

A pair of undercoating films 108 formed so as to join both ends of the reproduction element 107 are formed so as not to contact each other. As the undercoating films 108, for example, Cr films of 20 to 60 nm in thickness are used.

A pair of hard magnetic material films 109 disposed respectively on the pair of undercoating films The 108 and the MR film 106 do not contact each other. hard magnetic material film 109 is made of a hard magnetic material, and its film thickness is 20 to 50 nm. As the material for depositing the hard magnetic material films 109, at least one Co alloy selected from the group of CoNiPt, CoPt, CoCrPt, CoCrTa, CoCrTaPt, CoNiCr, CoNiCrPt, and CoNi may be used. By disposing the hard magnetic material films 109 on the undercoating films 108, the coercive force can be increased. The length L of the portion of the hard magnetic material film 109 facing the MR film 106, is preferably 10% to 30% of the length of the MR film 106 if the length of the MR film 106 (the length along the direction of the sense current is flowing) is within 30 microns.

A pair of leads 110 disposed on the MR film 106, hard magnetic material film 109, and insulating film 103 are provided so as not to contact each other. The leads 110 supply a sense current to the MR film 106 in the direction shown by the large arrow in FIG. 4. At this time, the contact part 110a of the lead 110 is formed with the MR film 106 between the end portions 109a of the hard magnetic material films 109.

That is, the distance between the pair of leads 110 on the MR film 106 is narrower than the distance between the pair of hard magnetic material films 109. In other words, the contact portions 110a of the pair of leads 110 with the MR film 106 are disposed between the pair of hard magnetic material films 109. At this time, the portion between the pair of leads 110 is the track portion T.

The leads 110 are composed of conductive material such as gold and tungsten, and the film thickness is 80 to 300 nm.

The constituent material and fabrication method of the insulating film 111 provided so as to cover the reproduction element 107 and leads 110 are almost same as those of the insulating film 103.

A shield film 112 disposed on the insulating film 111 is composed of the same materials as the shield film 102.

An insulating film 113 disposed on the shield film 112 and composed of insulating material such as $Al_2O_3$ and $SiO_2$ separates a reproducing head and a recording head.

A lower magnetic layer 114 disposed on the insulating film 113 is composed of a soft magnetic material such as permalloy and sendust.

A gap layer 115 disposed on the lower magnetic layer 114 as a magnetic gap is formed by sputtering a non-magnetic material such as $SiO_2$.

An interlayer insulating film 116 disposed on the gap layer 115 is formed of an insulating material such as resist material.

A coil film 117 disposed on the interlayer insulating film 116 is composed of conductive material such as copper and gold, and formed by plating or other conventional methods.

An interlayer insulating film 118 disposed on the interlayer insulating film 116 so as to cover the coil film 117 is composed of an insulating material such as resist material.

An upper magnetic layer 119 disposed on the interlayer insulating film 118 for completing a magnetic circuit together with the lower magnetic layer 114, is composed of a soft magnetic material such as permalloy and sendust.

A protective film 120 provided so as to cover the film composition is composed of a material excellent in weather resistance such as $Al_2O_3$.

Thus, the lower magnetic layer 114, gap layer 115, interlayer insulating film 116, coil film 117, interlayer insulating film 118, upper magnetic film 119 and protective film 120 are combined to compose a recording head.

Figure 5:
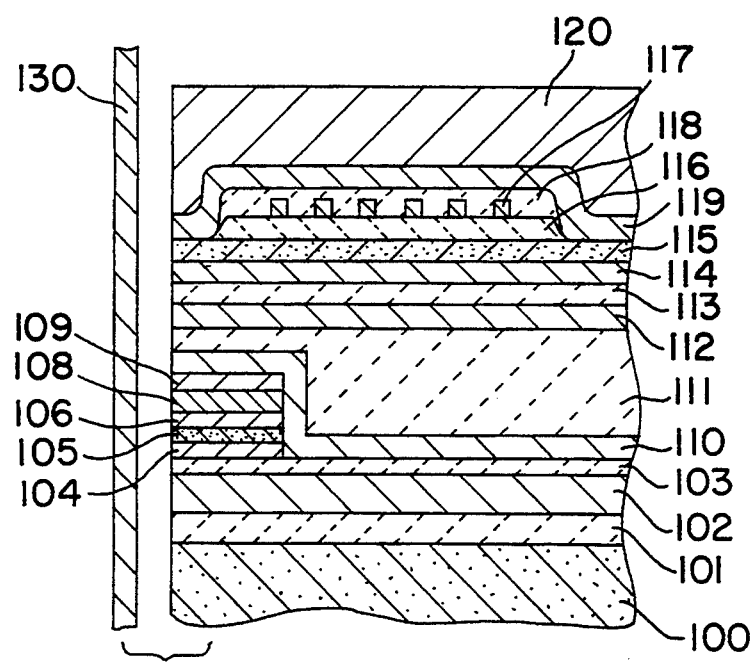
FIG. 5 is a sectional view taken in a plane orthogonal to the side facing the magnetic recording medium.
Figure 6:
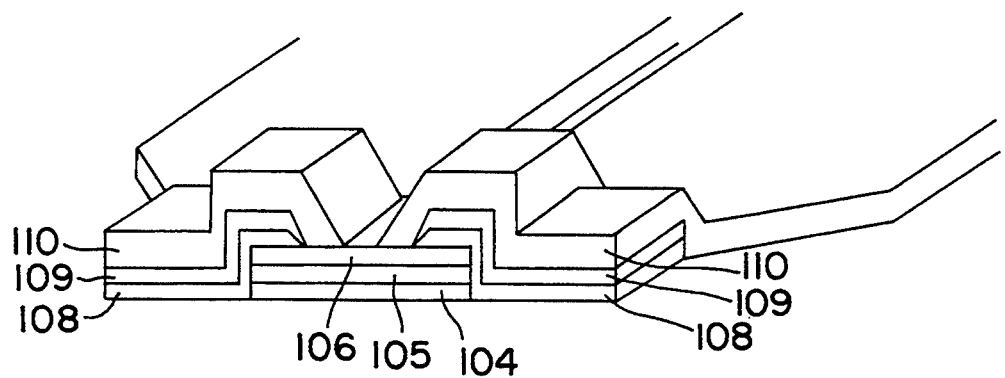
FIG. 6 is its perspective view of the device of FIG. 4.

Thus resulting MR magnetic head, as shown in FIG. 5, records magnetic data into a magnetic recording medium 130 by the magnetic flux moving in and out of the upper magnetic layer 119 and lower magnetic layer 114, and reads the data from the magnetic recording medium 130 by the reproduction element 107.

Figure 2:
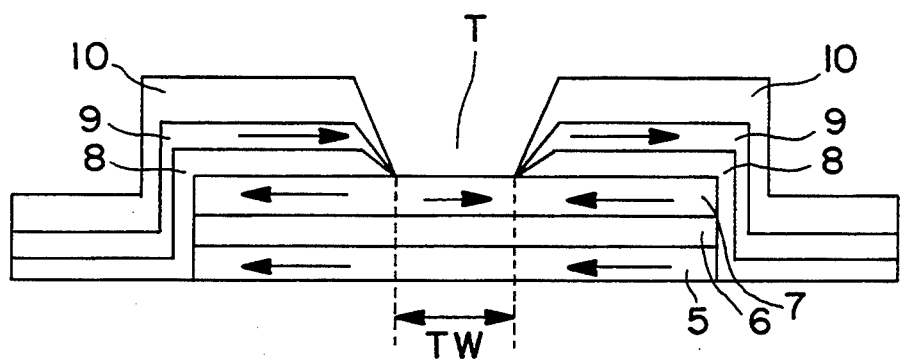
FIG. 2 is its partially enlarged view of a portion of the magnetic head of FIG. 1.
Figure 3:
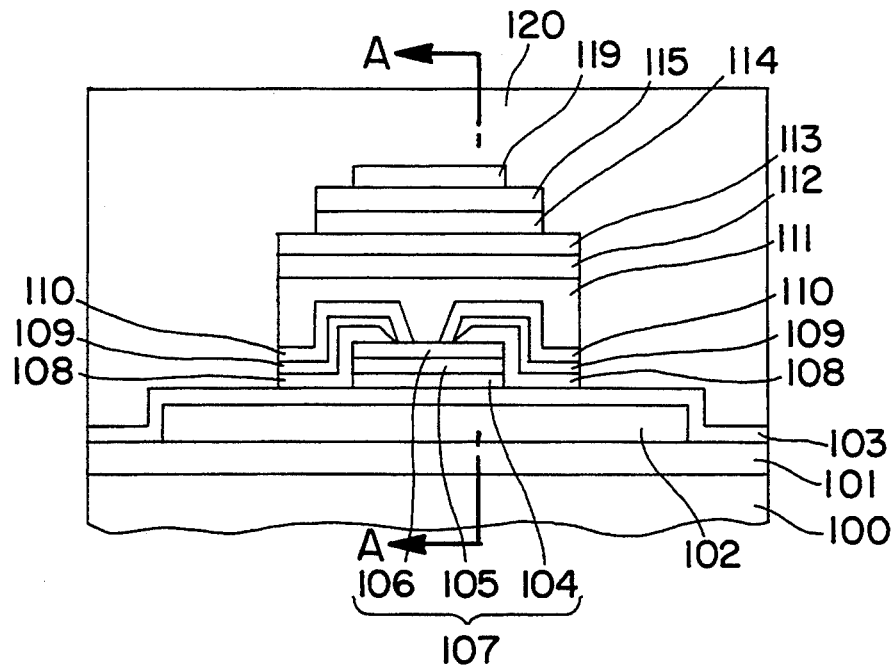
FIG. 3 is a front view of a magnetoresistive magnetic head in Embodiment 1 as seen from the side confronting a magnetic recording medium.
Figure 4:
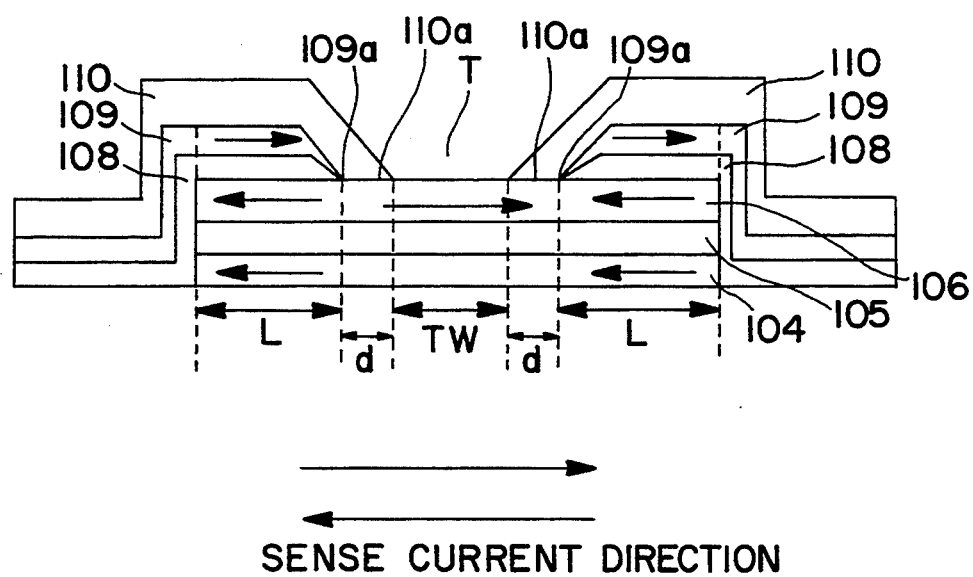
FIG. 4 is its partially enlarged view of a portion of the magnetic head of FIG. 3.

As shown in FIG. 4, the direction of magnetization at the ends of the track part T in the MR magnetic head is parallel to the magnetic recording medium surface facing the head, and the reproduction output of this head is larger than that of the conventional head. That is, as understood from FIG. 2, in the MR head of the prior art, since the hard magnetic material film 9 is present near the track portion T, both ends of the track portion T are unstable in the direction of magnetization, and the magnetic field generated from the hard magnetic material film 9 is strongly applied on the track portion T, so that the effective sensitivity of the MR film 7 will be lowered. By contrast, in the embodiment, shown in FIG. 4, when connecting the lead 110 to the MR film 106, since the contact portion 110a with the MR film 106 of the lead 110 is provided at the inner side of the end portion 109a of the hard magnetic material film 109, the hard magnetic material 109 is substantially separated from the track portion T. Accordingly, the direction of magnetization of the track portion T is parallel to the surface of magnetic recording medium facing the track in the central part and its both ends, and the effect of the magnetic field from the hard magnetic material film 109 at the track portion T is smaller than in the prior art, and hence the effective sensitivity at the track portion T is improved so that the reproduction output increases. However, if the hard magnetic material film 109 is set too far from the track portion T, the suppressing effect of Barkhausen noise is decreased, and hence the value of length d shown in FIG. 4 must be optimized depending on the residual magnetic flux density of the material to be used, as well as the thickness and length of the hard magnetic material film 109. When using a Co alloy, the desired length d should be somewhere between 2 microns and 5 microns.

Furthermore, in this embodiment, since the direction of magnetization of both ends of the track portion T is not random, the Barkhausen noise can be lowered, and the reproduction output waveform is not disturbed. Furthermore, in servo control, if the MR magnetic head goes off the track, the linearity of the reproduction output is not impaired.

The off-track characteristics of the MR magnetic head of the embodiment are discussed below.

In a typical head thickness of the films being used are; the bias film 104 is made of NiFeRh having a thickness of 22 nm, the spacer 105 is made of Ta having a thickness of 20 nm, the MR film 106 is made of Ni—Fe having a thickness of 30 nm, the undercoating film 108 is made of Cr having a thickness of 40 nm, and the hard magnetic material film 109 is made of CoNiPt having a thickness of 40 nm. The recording track width is 5 microns, and the width of the reproduction track portion T is 3 microns. In the embodiment of FIGS. 3, 4, 5 and 6, the value of the length d shown in FIG. 4 was fabricated at 3 microns as a trial.

Figure 7A:
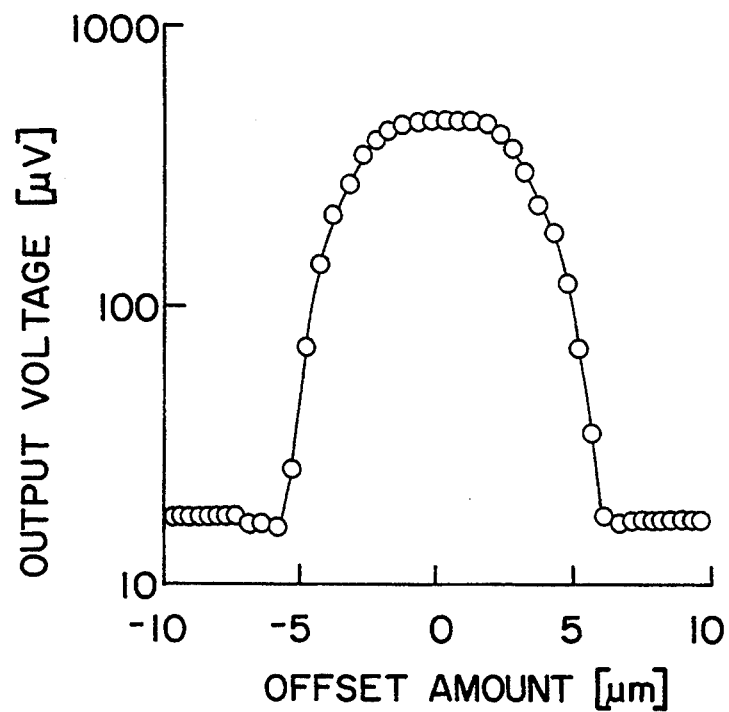
FIG. 7(a) is a graph showing an off-track characteristic of the magnetoresistive magnetic head in Embodiment 1.
Figure 7B:
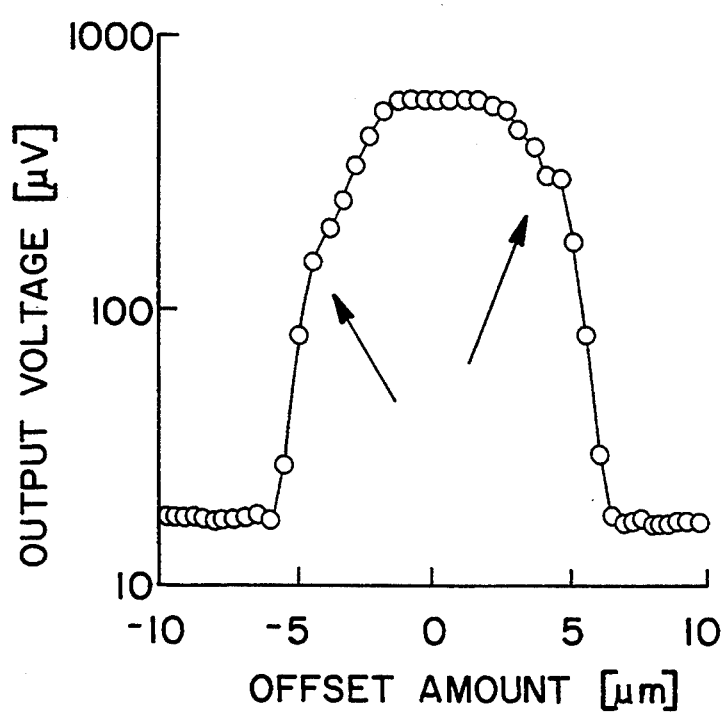
FIG. 7(b) is a graph showing an off-track characteristic of a conventional magnetoresistive magnetic head.

The measurements were taken, by using a 2.5-inch magnetic disk, at peripheral speed of 4.5 m/s and frequency of 2 MHz. The results of these measurements are shown in FIG. 7(a) and FIG. 7(b). In the prior art, near the track end portions, disturbance of the reproduction output due to instability of the state of magnetization was observed, but in the device according to the invention, an off-track characteristic of excellent linearity was obtained.

Figure 8:
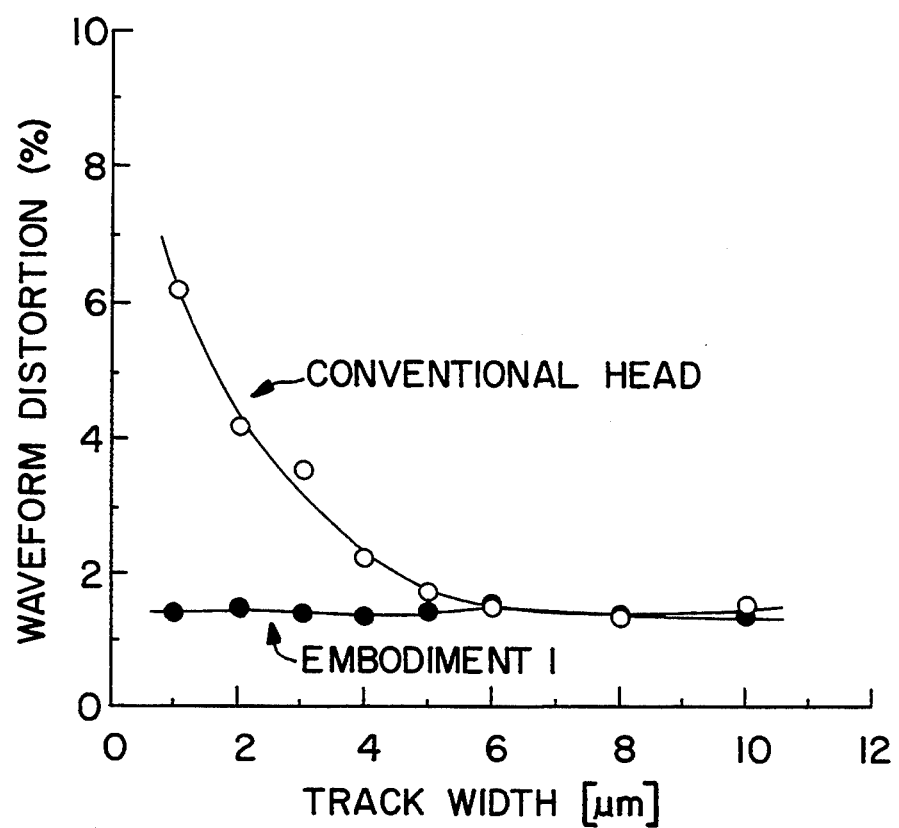
FIG. 8 is a graph showing the relation between the track width and waveform distortion, comparing Embodiment 1 and the prior art.

The waveform distortion was measured by varying the reproduction track width. The waveform distortion was determined after 32 times of continuous recording and reproduction. The mean (X) and standard deviation (s) of the outputs were obtained and s/X was determined. The results of the measurements are plotted in FIG. 8. In the prior art, as the track width becomes narrower than 5 microns, the value of waveform distortion gradually becomes large, however in the embodiment according to the invention, there was no marked difference, in particular even if the track width became narrow. Hence, the invention is particularly effective at the track width of 5 microns or less.

The manufacturing method of the MR reproducing head of the first embodiment is explained below.

Figure 9:
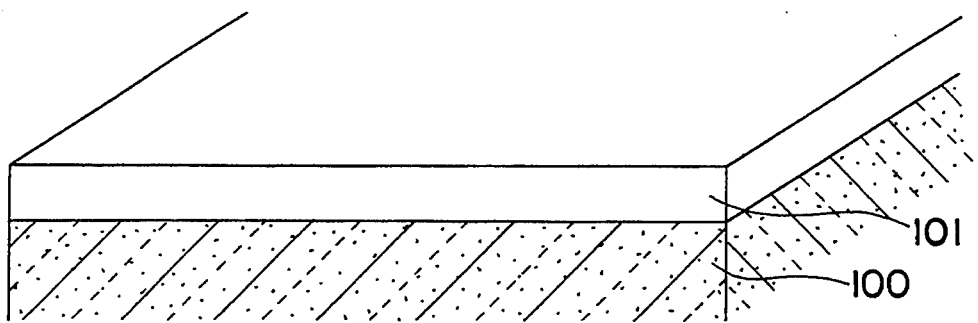
FIGS. 9 through 15 are perspective views for explaining the steps in the method of manufacturing the magnetoresistive magnetic head in Embodiment 1.
Figure 10:
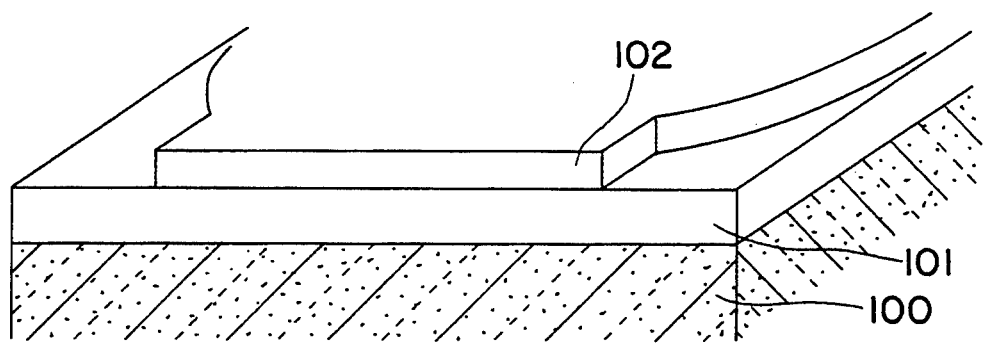
Figure 11:
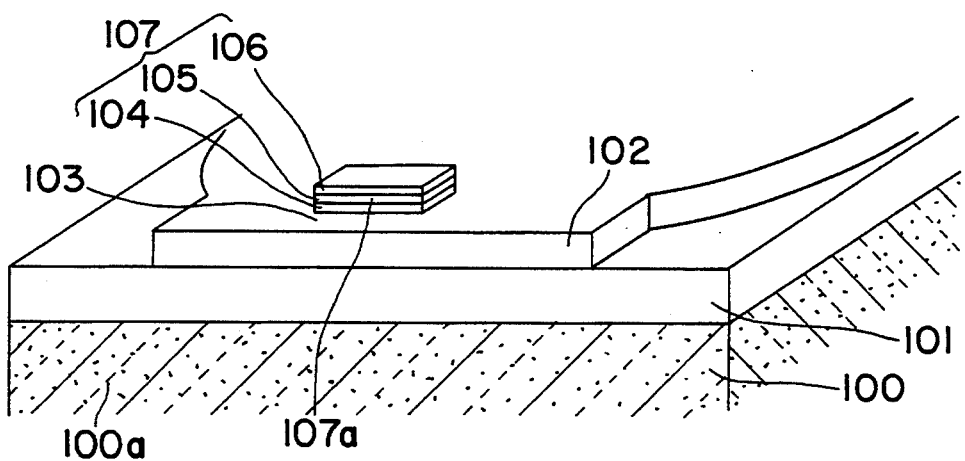

First, as shown in FIG. 9, the film forming surface of the substrate 100 is flattened by machining, and the insulation film 101 is formed on the film forming surface by a sputtering method. At this time, if $Al_2O_3$ is used as constituent material of the insulating film 101, since the surface is rough, it is flattened by a lapping method or the like. Next, as shown in FIG. 10, the shield film 102 is formed on the insulating film 101. At this time, the shield film 102 is formed by a plating method on the insulating film 101, and in a specified shape is formed in the plated film by a milling method or the like. Subsequently, as shown in FIG. 11, the insulating film 103 is formed on the shield film 102 and insulating film 101. The insulating film 103 is formed by sputtering the insulating material such as $Al_2O_3$. Next, bias film 104, spacer 105, and MR film 106 are formed on the insulating film 103 in this sequence, and the reproducing element 107 is formed. The reproducing element 107 is shaped to a specified form by milling. In FIG. 11, the insulating film 103 is not shown for the sake of simplicity of drawing. Therefore, the end surface 107a of the reproducing element 107 is flush with the magnetic recording medium facing surface 100a.

Figure 12:
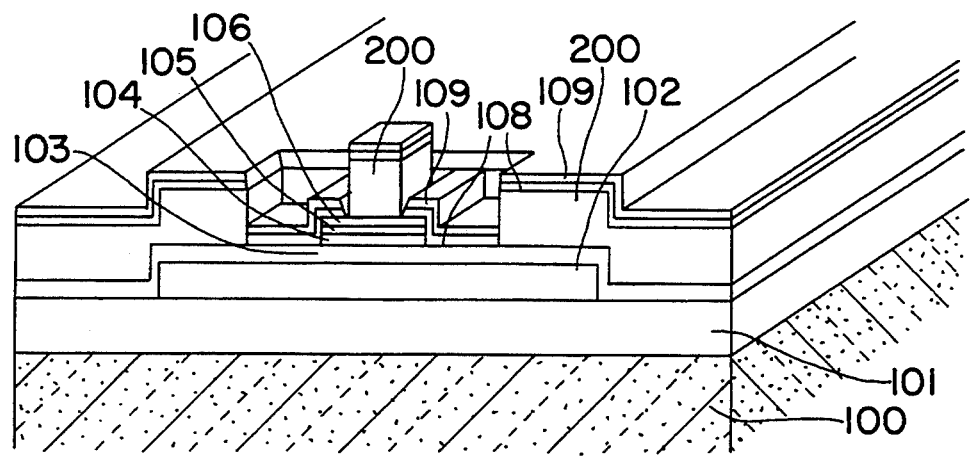
Figure 13:
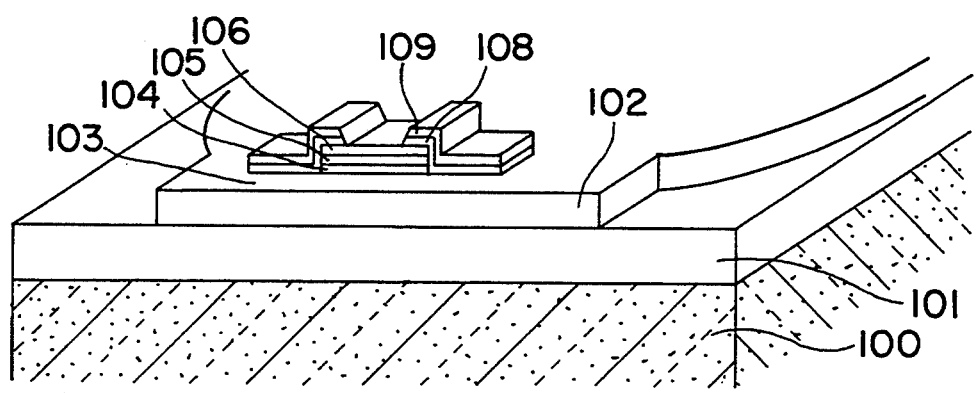

Next, as shown in FIG. 12, in the parts excluding the MR film 106 and insulating film 103 at both ends of the MR film 106, a photo resist 200 of specified shape is formed, and the undercoating film 108 is formed by a sputtering method thereon, and the hard magnetic material film 109 is laminated on the undercoating film 108 by sputtering. Removing the photo resist 200, the undercoating film 108 and hard magnetic material film 109 are formed on the MR film 106 and at both ends of the MR film 106 as shown in FIG. 13.

Figure 14:
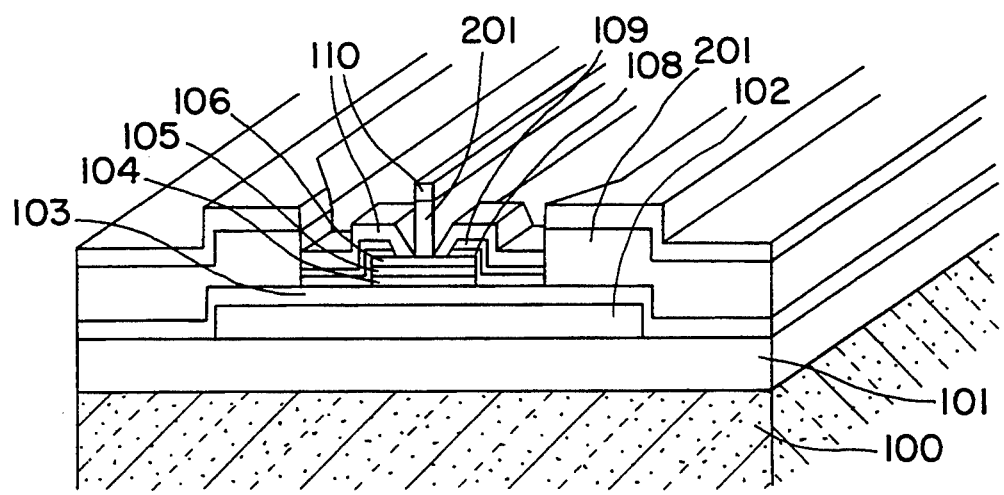
Figure 15:
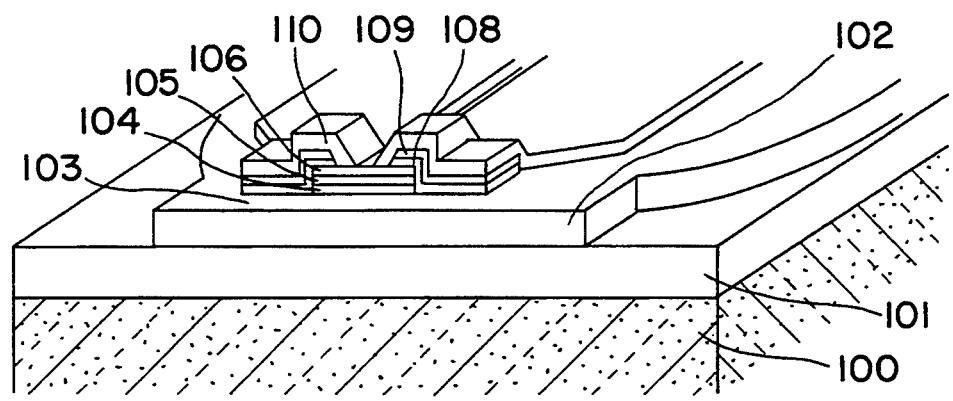

Next, as shown in FIG. 14, after forming a photo resist 201 in a specified shape, the lead 110 is formed by evaporation or the like. Afterwards, by removing the photo resist 201, the lead 110 is formed as shown in FIG. 15. Hitherto, when forming the hard magnetic material film 109, the leads were formed at the same time, and the structure was as shown in FIG. 1. According to the invention, as shown in FIG. 14, between the pair of hard magnetic material films 109 on the MR film 106, a photo resist 201 narrower than the distance between the pair of hard magnetic material films 109 is formed in order to form the lead 110, so that the distance between the pair of leads 110 may be set narrower than the distance between the pair of hard magnetic material films 109.

Embodiment 2

Figure 16:
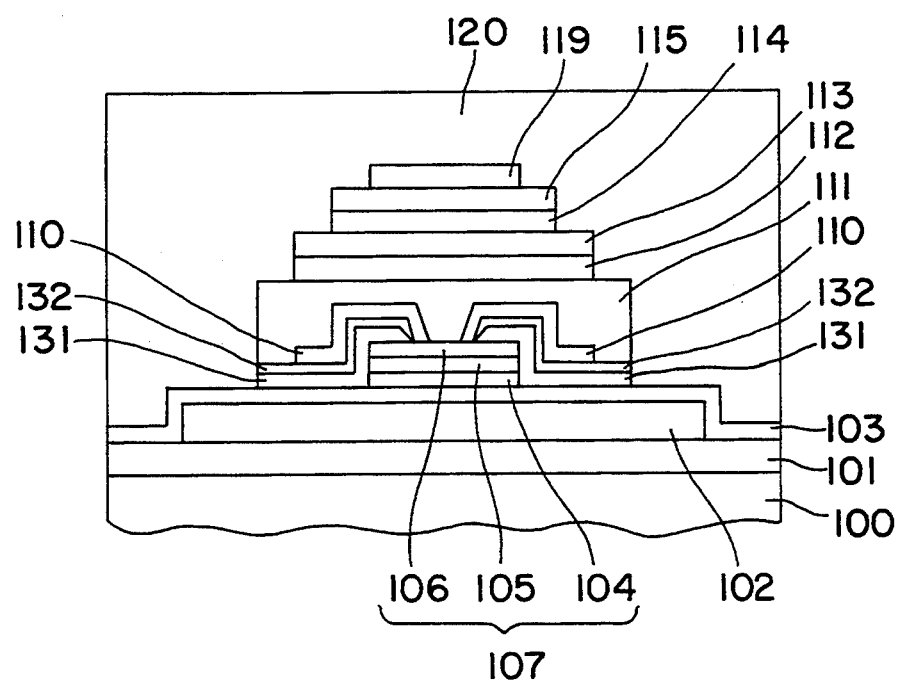
FIG. 16 is a front view of a magnetoresistive magnetic head in Embodiment 2 as seen from the side facing the magnetic recording medium.

FIG. 16 shows a magnetoresistive magnetic head as a modified form of Embodiment 1. What differs from Embodiment 1 is that the length of an undercoating film 131 and a hard magnetic film 132 are longer than the length of the lead 110. Usually, Au is used for the lead 110, but Au is a soft metal and it is preferred that it not be exposed to the surface of the head. However, the amount of magnetic flux generated from the hard magnetic material film 132 differs with the length of the hard magnetic material film 132, and as the length becomes shorter, the anti-magnetic field components become larger, and the amount of magnetic flux decreases. In this embodiment, the lead layer exposed to the head surface is kept to a minimum required limit, and the length of the hard magnetic material film 132 is elongated. Therefore a sufficient magnetic flux is generated, and the magnetic domain of the MR film 106 can be controlled.

In Embodiments 1, 2, meanwhile, the head using the SAL bias is explained, but the bias method is not particularly limited, and it is evident that the same effects are obtained by the current bias method or shunt bias method. According to the invention, the structure of the head separating the MR reproducing head and recording head is disclosed, but the structure is not limited to this structure alone, and it is evident that the same effects can be obtained, for example, by the unified head of the upper shield layer and lower core layer, or by the MR reproducing head alone.

The invention, according to the embodiments disclosed, is not influenced by the external magnetic field or recording magnetic field, and offers the excellent off-track characteristics capable of stabilizing the state of magnetization of the track width direction, thereby stabilizing the servo characteristics. In particular, when the track width is narrow, excellent stability in the reproduction output is obtained with the magnetic head.

What is claimed is:

1. A magnetoresistive magnetic head comprising
   a magnetoresistive film,
   a pair of spaced apart hard magnetic material films disposed on the magnetoresistive film, and
   a pair of spaced apart leads for feeding a sense current to the magnetoresistive film, wherein at least a part of each lead of said pair of leads is disposed on the magnetoresistive film and is formed between the pair of spaced apart hard magnetic material films, whereby, the distance between said spaced apart leads is narrower than the distance between said spaced apart hard magnetic material films.

2. The magnetoresistive magnetic head of claim 1, wherein an undercoating film is disposed between each of the pair of hard magnetic material films and the magnetoresistive film.

3. The magnetoresistive magnetic head of claim 2, wherein the pair of hard magnetic material films is composed of Co alloy, and the undercoating film is composed of Cr.

4. A magnetoresistive magnetic head comprising
   a magnetoresistive film,
   a pair of hard magnetic material films disposed in a spaced apart relationship on the magnetoresistive film, and
   a pair of leads disposed in a spaced apart relationship on the pair of hard magnetic material films, wherein a part of each lead of the pair of leads is formed between the pair of hard magnetic material films on the magnetoresistive film, whereby, the distance between the spaced apart leads is narrower than the distance between the spaced apart hard magnetic material films.

5. The magnetoresistive magnetic head of claim 4, wherein an undercoating film is disposed between each of the hard magnetic material films and the magnetoresistive film.

6. The magnetoresistive magnetic head of claim 5, wherein the pair of hard magnetic material films is composed of Co alloy, and the undercoating film is composed of Cr.

7. A magnetoresistive magnetic head comprising
   a magnetoresistive film,
   a pair of undercoating films disposed in a spaced apart relationship on the magnetoresistive film,
   a pair of hard magnetic material films disposed in a spaced apart relationship on the pair of undercoating films, and
   a pair of leads disposed in a spaced apart relationship on the pair of hard magnetic material films, wherein a part of each lead of the pair of leads contacts with the magnetoresistive film and is disposed between the pair of hard magnetic material films, whereby, the distance between said spaced apart leads is narrower than the distance between said spaced apart hard magnetic material films.

8. The magnetoresistive magnetic head of claim 7, wherein the length of the contact for the part of each lead of the pair of leads with the magnetoresistive film is 2 microns to 5 microns measured in the direction current flows in the magnetoresistive film.

9. The magnetoresistive magnetic head of claim 2, wherein when the length of the magnetoresistive film is 100%, the length of each of the hard magnetic material films disposed on the magnetoresistive film is between 10% to 3.0%, the length measured in the direction current flows in the magnetoresistive film.

10. A magnetoresistive magnetic head comprising
    a substrate,
    a first shield film formed on the substrate,
    a magnetoresistive film disposed on the first shield film,
    a pair of undercoating films disposed in a spaced apart relationship on the magnetoresistive film,
    a pair of hard magnetic material films disposed in a spaced apart relationship on the pair of undercoating films respectively,
    a pair of leads disposed in a spaced relationship on the pair of hard magnetic material films wherein a part of each lead of the pair of leads contacts with the magnetoresistive film and is disposed between the pair of hard magnetic material films, whereby, the distance between the spaced apart leads is narrower than the distance between the spaced apart hard magnetic material films
    a second shield film disposed on the pair of leads, and
    a recording head disposed on the second shield film.

11. The magnetoresistive magnetic head of claim 10, wherein the length of the contact for the part of each lead of the pair of leads with the magnetoresistive film is 2 microns to 5 microns measured in the direction current flows in the magnetoresistive film.

12. The magnetoresistive magnetic head of claim 10, wherein when the length of the magnetoresistive film is 100%, the length of each of the hard magnetic material films disposed on the magnetoresistive film is between 10% to 30%, the length measured in the direction current flows in the magnetoresistive film.

13. The magnetoresistive magnetic head of claim 10, wherein the recording head comprises a lower magnetic layer disposed on the second shield film, a gap layer disposed on the lower magnetic layer, a coil layer disposed on the gap layer, an upper magnetic layer composing a magnetic circuit together with the lower magnetic layer, being disposed on the coil layer, and a protective layer disposed on the upper magnetic layer.

14. A magnetoresistive magnetic head comprising
    a substrate,
    a first shield layer formed on the substrate,
    a first insulating layer as a lower reproduction gap disposed on the first shield layer,
    a reproduction element comprising a soft magnetic material film for applying a transverse bias magnetic field disposed on the first insulating layer, a spacer disposed on the soft magnetic material film and a magnetoresistive film disposed on the spacer, the magnetoresistive film being magnetically decoupled with the soft magnetic material film by the spacer, a pair of undercoating films disposed in a spaced apart relationship on the magnetoresistive film, a pair of hard magnetic material films disposed in a spaced apart relationship on the pair of undercoating films respectively, a pair of leads disposed in a spaced apart relationship on the pair of hard magnetic material films, wherein a part of each lead of the pair of leads contacts the magnetoresistive film and is disposed between the pair of hard magnetic material films, whereby, the distance between said spaced apart leads is narrower than the distance between said spaced apart hard magnetic material films, a second insulating layer as an upper reproduction gap disposed on the pair of leads, provided to cover the reproduction element and the pair of leads, a second shield layer disposed on the second insulating layer, and a recording head disposed on the second shield film.

* * * * *

UNITED STATES PATENT AND TRADEMARK OFFICE
CERTIFICATE OF CORRECTION

PATENT NO.    : 5,442,507
DATED         : Augsut 15, 1995
INVENTOR(S)   : N. Koga et al.

It is certified that error appears in the above-identified patent and that said Letters Patent is hereby corrected as shown below:

In column 8, claim 9, line 12, delete "claim 2" and insert --claim 7--.

In column 8, claim 9, line 16, delete "3.0%" and insert therefor --30%--.

Signed and Sealed this

Ninth Day of April, 1996

Attest:

BRUCE LEHMAN

Attesting Officer        Commissioner of Patents and Trademarks